United States Patent
Browne et al.

(10) Patent No.: US 8,661,810 B2
(45) Date of Patent: Mar. 4, 2014

(54) SHAPE MEMORY ALLOY ACTUATOR WITH ENHANCED HEAT TRANSFER CHARACTERISTICS

(75) Inventors: Alan L. Browne, Grosse Pointe, MI (US); Nancy L. Johnson, Northville, MI (US); Xiujie Gao, Troy, MI (US); James Holbrook Brown, Costa Mesa, CA (US); Nilesh D. Mankame, Ann Arbor, MI (US); Nicholas W. Pinto, IV, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 13/048,952

(22) Filed: Mar. 16, 2011

(65) Prior Publication Data

US 2012/0234000 A1    Sep. 20, 2012

(51) Int. Cl.
*F01B 29/10* (2006.01)
*F02G 1/04* (2006.01)

(52) U.S. Cl.
USPC .............................................. 60/529; 60/528

(58) Field of Classification Search
USPC ................................... 60/527–529; 174/16.3
See application file for complete search history.

(56) References Cited

U.S. PATENT DOCUMENTS

| | | | | |
|---|---|---|---|---|
| 3,035,115 | A * | 5/1962 | Heckel et al. | 174/110 R |
| 6,583,533 | B2 * | 6/2003 | Pelrine et al. | 310/309 |
| 2003/0231471 | A1 * | 12/2003 | De Lorenzo et al. | 361/719 |
| 2006/0231242 | A1 * | 10/2006 | Hawranek | 165/157 |
| 2007/0284255 | A1 * | 12/2007 | Gorokhovsky et al. | 205/89 |
| 2009/0277170 | A1 * | 11/2009 | Gao et al. | 60/528 |

OTHER PUBLICATIONS

Rochi I. Fabrication and characterization of an SU-8 gripped actuated by a shape memory alloy thin film. J. Mircomech Microneng (2003).*

Mohamed Ali. Frequency-controlled wireless shape-memory alloy microactuators integrated using an electroplating bonding process. Sensors and Actuators A: Physical (2010).*

* cited by examiner

*Primary Examiner* — Thomas E. Denion
*Assistant Examiner* — Brian Inacay
(74) *Attorney, Agent, or Firm* — Quinn Law Group, PLLC

(57) ABSTRACT

A shape memory alloy (SMA) actuator includes an SMA element and a flexible outer coating or layer. The element is respectively activated by a heating source. The layer surrounds the element, and enhances the heat transfer characteristics of the element to increase the speed of the actuation cycle. The nominal geometry and/or thermal conductivity may be altered during an activation phase, and may include discrete elements oriented with respect to the element, and partially embedded in the layer. An end gripper assembly may be used to cause the layer to move in concert with the element during a phase transformation. An electro-mechanical system includes the cooling source and the actuator. A method includes connecting the actuator to a load, activating the element using the heating source, and deactivating the element using a cooling source or free/ambient air.

19 Claims, 3 Drawing Sheets

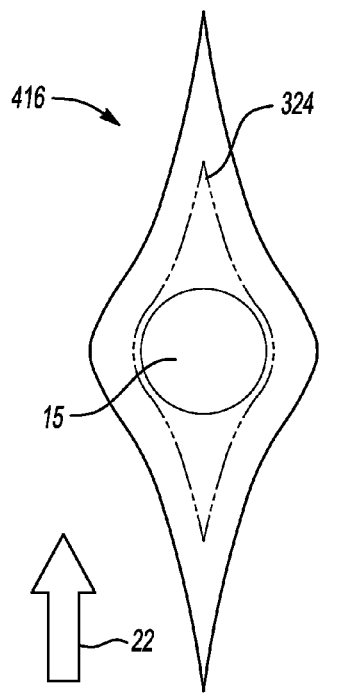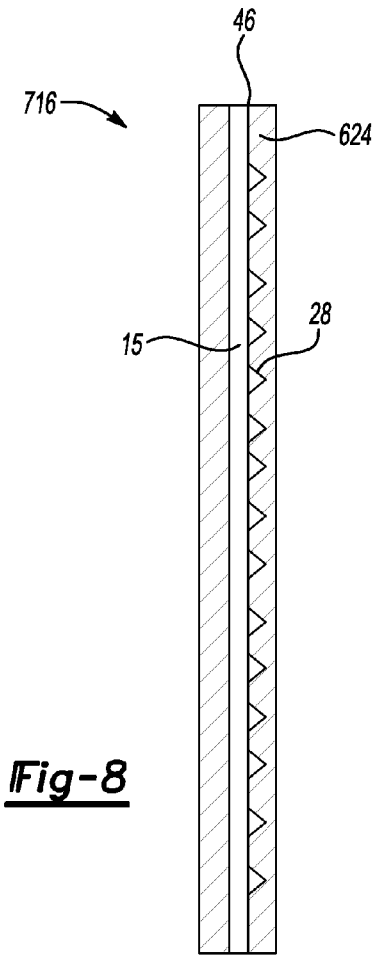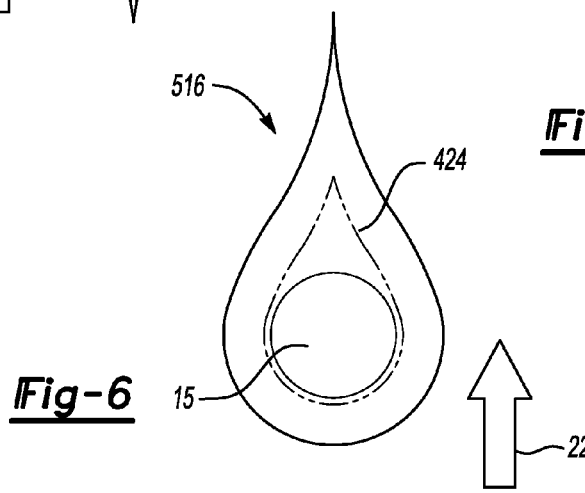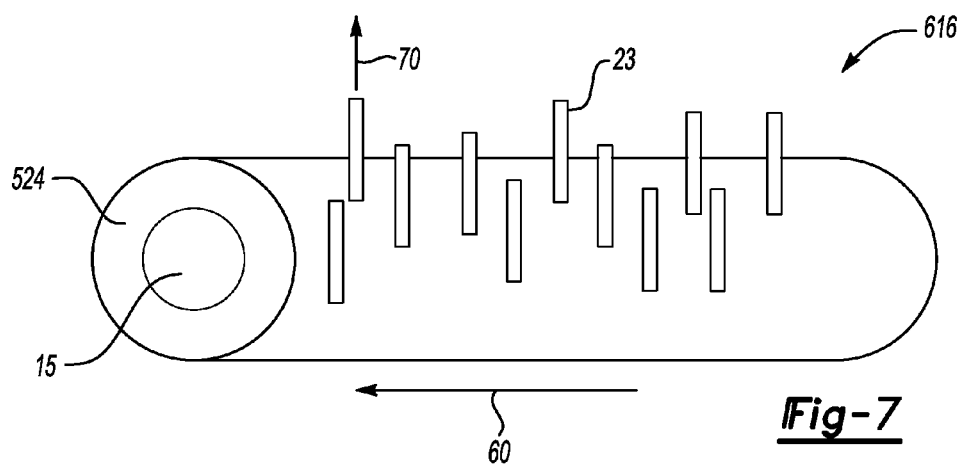

the following detailed description of the best modes for carrying out the invention when taken in connection with the accompanying drawings.

SHAPE MEMORY ALLOY ACTUATOR WITH ENHANCED HEAT TRANSFER CHARACTERISTICS

TECHNICAL FIELD

The present disclosure relates to a shape memory alloy actuator having a flexible outer coating or layer providing enhanced heat transfer characteristics.

BACKGROUND

In an electro-mechanical system, a force may be applied to an output load using a variety of different actuators, e.g., motors, valves, pistons, or levers. An active material element may be used to enhance overall system performance. For instance, an element formed from a shape memory alloy (SMA) can be used to apply a desired force within the system. SMA elements exhibit pseudo-elasticity, pseudo-plasticity, and shape memory. Such properties may be useful in certain applications.

SUMMARY

A shape memory alloy (SMA) actuator is disclosed herein having an optimized cycle time relative to conventionally configured SMA actuators. The functionality of an SMA actuator is based on its thermally-activated shape memory and modulus changes. Some SMA actuators can be rapidly heated during an activation phase of an actuation cycle. However, it may be more difficult to rapidly cool the same SMA actuator during the return/disengagement phase of the actuation cycle. Additionally, the actuation cycle in a resistance heating application may differ, sometimes substantially, from that of an ambient heating application, e.g., use of an SMA actuator in a high temperature environment. The present SMA actuator therefore includes a flexible outer coating or layer which enhances the heat transfer characteristics of the actuator, thus improving cycle times as noted above.

In particular, an SMA actuator is disclosed herein which includes an SMA element, e.g., a wire, a strip, or any other SMA element having a desired cross-sectional shape. The SMA element is enclosed within a flexible outer layer. The flexible outer layer has a predetermined cross-sectional geometrical shape, which may or may not match that of the SMA element contained therein, and a material composition that, together with the shape, collectively optimizes the heat transfer characteristics of the SMA actuator. This in turn increases the speed of the actuation cycle. The SMA actuator is activated using a heating source during an activation phase of an actuation cycle, and is deactivated during a deactivation/return phase. Properties of the SMA actuator may be selected for a given application to increase the speed of either or both parts of the actuation cycle, i.e., the activation and deactivation phases.

An electro-mechanical system is also disclosed which includes a heating source and an SMA actuator configured as set forth above.

A method is also disclosed for reducing a cycle time of the above SMA actuator. The method includes providing an SMA actuator configured as set forth above, connecting the SMA actuator to a load, activating the SMA actuator using an active or passive heating source, and deactivating the SMA element, for example using a cooling source, free air, or ambient cooling.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic end view illustration of an SMA actuator having a flexible outer layer providing an elongated marquise-shaped cross-section;

FIG. 6 is a schematic end view illustration of an SMA actuator having a flexible outer layer providing a tear drop-shaped or tapered cross-section;

FIG. 7 is a schematic side view illustration of an SMA actuator having a flexible outer layer with discrete elements embedded in the layer;

FIG. 8 is a schematic illustration of an SMA actuator having an SMA element with radial features suitable for engaging an enhanced flexible outer sleeve;

DETAILED DESCRIPTION

Figure 1:
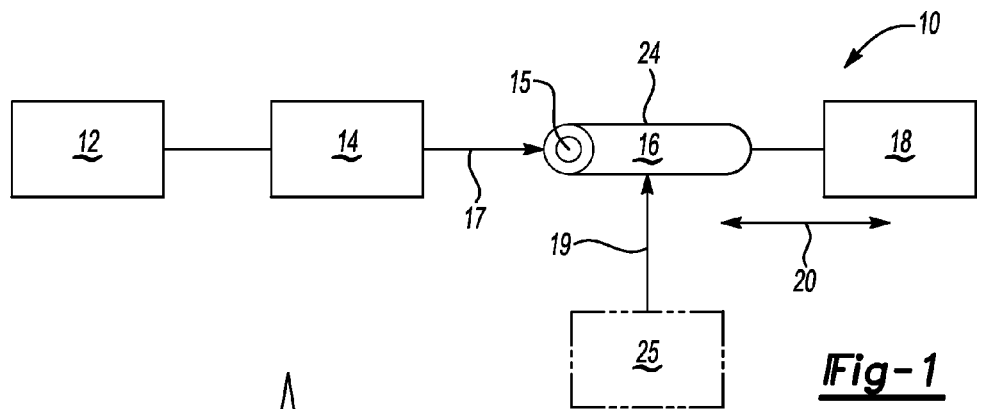
FIG. 1 is a schematic illustration of an electro-mechanical system using a shape memory alloy (SMA) actuator as disclosed herein.

Referring to the drawings, wherein like reference numbers correspond to like or similar components throughout the several figures, and beginning with FIG. 1, an electro-mechanical system 10 includes a shape memory alloy (SMA) actuator 16. The SMA actuator 16 includes a flexible outer coating or layer 24, which as explained below reduces a cycle time required for actuating the SMA actuator 16. The flexible outer layer 24 may be applied with respect to an SMA element 15. While shown as a cylinder or wire in the various Figures for illustrative consistency and simplicity, the SMA element 15 may have a cross-sectional shape which uniquely fits the desired application. For instance, any of the geometric cross sections described below with reference to FIGS. 2-7 may be used with the SMA element 15 contained therein, as well as shapes not shown herein, e.g., a peanut shape, a strip, etc.

The SMA actuator 16 is configured to move or otherwise act on a load 18, thus moving the load 18 as generally indicated by arrows 20. The actual direction of motion may be linear as shown, non-linear, or rotational depending on the configuration of the SMA actuator 16 and any linking mechanisms, as will be understood in the art. The load 18 may be embodied as any physical object or device with respect to which a force can be applied.

In one embodiment, a controller 12 may be in communication with a heating source 14, e.g., a heat blower, a coil, a convection device, etc., suitable for providing a heating signal (arrow 17) as a thermal activation signal into the SMA actuator 16. The heating signal (arrow 17) may likewise come from the surrounding environment, such as when the SMA actuator 16 is used in an engine compartment of a vehicle. In this example, the device would be the engine (not shown) or other heat-generating devices.

The controller 12 may also be in communication with an optional cooling source 25 as shown in phantom, e.g., a cold air blower, which provides a cooling signal (arrow 19). The optional cooling source 25 and the heating source 14 may, in some embodiments, be combined into a single device. For instance, by changing a heating/cooling temperature setting in a single blower device, one could readily change the output temperature as needed. When the cooling source 25 is not used, the SMA actuator 16 may be deactivated by deactivating the heating source 14 and/or by allowing heat transfer to occur to the surrounding free or still air for the required cooling.

As is known in the art, an SMA, which is sometimes referred to in the art as a "smart material", exhibits pseudo-elasticity and pseudo-plasticity properties as well as shape memory behavior, and thus has the ability to "remember" its original shape. The original shape of the SMA may be recalled subsequent to a shape deformation accomplished via an external stimulus, e.g., the heating signal (arrow 17). Deformation of the SMA from an original shape is temporary and reversible due in part to a temperature and stress-dependent solid-state change of phase and a cooperative atomic rearrangement.

The two phases of an SMA are the Martensite (m) phase and the Austenite (a) phase, which refer to the lower and higher temperature phases, respectively, in which the phase transformation occurs from a low-symmetry (m phase) to a highly symmetric (a phase) crystallographic structure. SMAs represent a unique class of thermally-activated smart materials (TASM) that undergo a reversible phase transformation responsible for stress-induced and temperature-induced recoverable deformation behavior. Some example SMA materials include copper-zinc-aluminum-nickel, copper-aluminum-nickel, and nickel-titanium.

Still referring to FIG. 1, the materials of construction of the flexible outer layer 24 and its various embodiments may include, for example, a high thermal conductivity flexible silicone, electronic paper, or a stretchable thin graphene film, e.g., a film which is deposited on the SMA element 15 via a vapor deposition process. In another embodiment, the flexible outer layer 24 may include carbon nanotubes (CNT) which are axially and/or radially oriented with respect to the SMA element 15. As is understood in the art, CNTs are allotropes of carbon having tubular or cylindrical nanostructures providing excellent conductivity and other unique electrical properties. The flexible outer layer 24 in any embodiment has sufficient surface area for providing the desired heat transfer characteristics.

The flexible outer layer 24 may be an applied coating, a sleeve, or any other suitable layer. The flexible outer layer 24 is shown schematically as being cylindrical for illustrative simplicity. However, the flexible outer layer 24 has a calibrated or otherwise predetermined geometric cross-sectional shape, such as one of the example configurations shown in FIGS. 2-6 and described below. In some embodiments, the nominal geometry of the flexible outer layer 24 may be altered during an activation phase of the SMA actuator 16, with a resultant enhancement in the thermal conductivity of the SMA actuator 16. Other embodiments may retain the same nominal geometry through the activation and return phases of an activation cycle. Use of the flexible outer layer 24 may be particularly well suited to straight, non-spooled configurations such as straight lengths of the SMA element 15, although other configurations are also possible.

Figure 2:
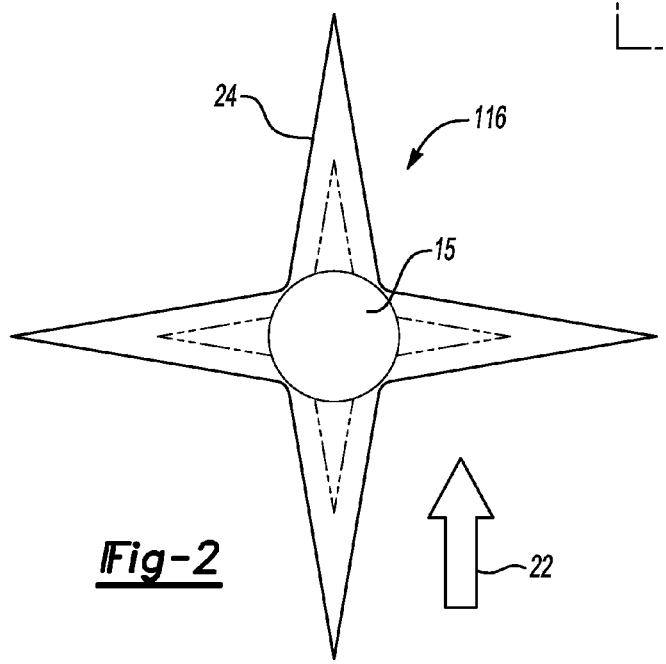
FIG. 2 is a schematic end view illustration of an SMA actuator having a flexible outer layer with a star-shaped cross-section.
Figure 3:
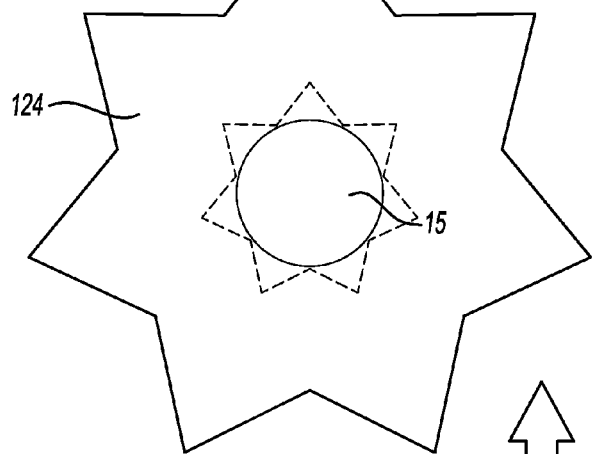
FIG. 3 is a schematic end view illustration of an SMA actuator having a flexible outer layer providing another star-shaped cross-section.

Referring to FIGS. 2 and 3, respective SMA actuators 116 and 216 are configured with different star-shaped cross sections according to two possible example geometric configurations. The star-shaped cross sections of FIGS. 2 and 3 may be optimal for a vertically-oriented or a horizontally-oriented SMA element 15 when used, for example, with natural heat convection during the activation phase. For other orientations, different cross sectional geometries may be more optimal.

In the configurations shown in FIGS. 2 and 3, the SMA element 15 is enclosed within the flexible outer layer 24, 124, respectively, which are formed or provided with multiple points as shown. While four points are shown in FIG. 2 and seven points are shown in FIG. 3, the number and size of points in the star-shaped cross section as provided by the flexible outer layer 24, 124 may vary depending on the application and desired heat transfer rates. The SMA actuators 116, 216 are in communication with the heating source 14 and, optionally, the cooling source 25 as shown in FIG. 1 so that any heated or cooled/ambient air flow, collectively represented by arrow 22, ultimately heats or cools the SMA actuator 116, 216 as needed.

Figure 4:
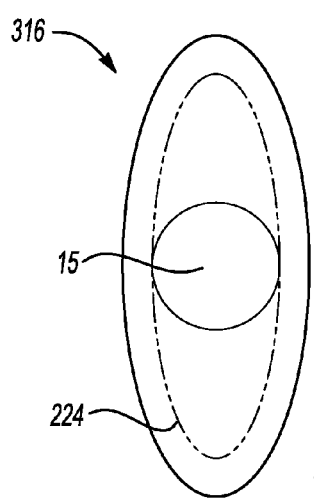
FIG. 4 is a schematic end view illustration of an SMA actuator having a flexible outer layer providing an oval-shaped cross-section.

Referring to FIGS. 4, 5, and 6, alternative cross sectional geometric configurations may include an oval shape (FIG. 4), an elongated marquise shape (FIG. 5), and a tear drop shape (FIG. 6), as well as additional geometric configurations not specifically described herein. The cross sections shown in FIGS. 4, 5, and 6 may have a lower profile drag relative to the star-shaped designs shown in FIGS. 2 and 3. The SMA actuator 316 of FIG. 4, the SMA actuator 416 of FIG. 5, and the SMA actuator 516 of FIG. 6 each include the SMA element 15, which is enclosed within a respective flexible outer layer 224, 324, and 424. The SMA actuators 316, 416, and 516 are in communication with the heating source 14 and, optionally, the cooling source 25 of FIG. 1 so that any heated or cooled/ambient air flow (arrows 22) respectively heats or cools the SMA actuators 316, 416, and 516 as needed.

The geometric configuration or cross-sectional shape of the outer layers 224, 324, 424 and/or the SMA element 15 in its various embodiments may be selected based on the speed of heat transfer required for a particular phase. For instance, in a resistance heating application, i.e., when the SMA element 15 is actively heated by electrical resistance, the flexible outer layer 24 in its various embodiments may be configured with a reduced amount of thermal conductivity. Ambient heating may benefit from an increased amount of thermal conductivity.

In other words, to reduce cycle times in applications in which a totally passive heat exchange occurs with the surrounding environment, such as when cycling the SMA actuator 16 between hot and cold regions (heating and cooling zones) such as in heat engines, the geometry and shape of the flexible outer layer 24 may be selected so to aid heat transfer into the SMA element 15 when the SMA actuator 16 is in a hot zone, e.g., high temperature air or water. The same configuration may aid heat transfer out of the SMA element 15 when the SMA actuator 16 is placed in a cool zone, i.e., high thermal conductivity and high surface area. In applications in which resistive heating is used in conjunction with passive heat transfer/cooling to the surrounding environment, a lower heat transfer rate could be provided during the heating of the SMA element 15, and higher heat transfer rates when cooling the SMA element 15.

The appropriate shape, size, and orientation of the SMA actuator 16 and its various alternative embodiments may be determined by calculation and/or using a suitable model, and with an understanding of the unique thermodynamic properties of the electromechanical system 10 (see FIG. 1). In the embodiments shown in FIGS. 2-6, the flexible outer layers 24, 124, 224, 324, and 424 each have a nominal geometry and thermal conductivity which remain unaltered during the phase change of the SMA element 15. As will now be explained, alternative embodiments may be used which alter the nominal geometry and/or the thermal conductivity of the SMA actuator 16 and its alternative embodiments.

Referring to FIG. 7, the flexible outer layers 24, 124, 224, 324, and 424 of FIGS. 1-6, respectively, may include a plurality of discrete elements 23. Such an SMA actuator is shown in FIG. 7 as the SMA actuator 616. The discrete elements 23 may be attached to an alternative flexible layer 524. For simplicity, the shape of SMA actuator 616 is cylindrical, however any of the shapes described above may be used.

When the SMA actuator 616 is activated via the heating source 14 of FIG. 1, the SMA actuator 616 shrinks in an axial direction as indicated by arrow 60. During this change in length, the discrete elements 23 change their relative position and/or alignment with respect to the SMA element 15. Depending on the construction of the discrete elements 23 and the change in relative position and/or alignment, this may increase the heat transfer rate. When the SMA actuator 616 returns to its original length, the discrete elements 23 may again align to thereby reduce the heat transfer rate. This process is repeatable with each actuation cycle of the SMA actuator 616.

The discrete elements 23 may be configured, for example, as high-conductivity fibers, CNTs, or other suitable elements which are oriented in a radially-outward direction with respect to the SMA element 15, and which are partially embedded within the flexible outer layer 524. When the SMA actuator 616 is activated, it shortens to some extent in the direction of arrow 60, as noted above, and the flexible outer layer 524 is compressed. This causes each of the discrete elements 23 to move in the direction of arrow 70, thus sticking farther out when the SMA actuator 616 is activated relative to when the same actuator is deactivated. When the SMA actuator 616 again cools, the discrete elements 23 retract to some extent back into the flexible outer layer 524.

Referring to FIG. 8, an embodiment of an SMA actuator 716 is shown in which an SMA element 15 is contained within a flexible outer layer 624. The flexible outer layer 624 is configured as an optional flexible sleeve. The SMA element 15 may or may not be bonded to the flexible outer layer 624 along an interface between the SMA element 15 and the flexible outer layer 624.

When the SMA element 15 is not bonded to the flexible outer layer 624, a thin layer of fluid having a sufficiently high thermal conductivity may be positioned at an interface 46 between the SMA element 15 and the flexible outer layer 624. This can help ensure a consistent level of thermal performance. In another embodiment, long-term adhesion between the SMA element 15 and the flexible outer layer 624 may be maintained by providing sufficient texture on the SMA element 15, e.g., radial projections 28. The radial projections 17, which may be of the same material as the SMA element 15, e.g., projections, bumps, or surface asperities, can provide a spatially-distributed mechanical interlock at or along the interface 46.

Figure 9:
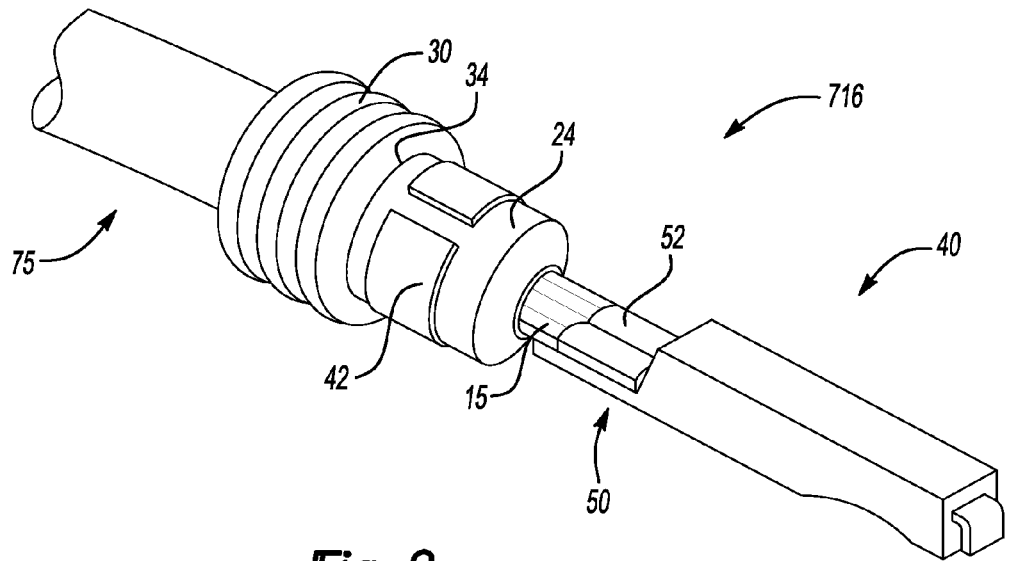
FIG. 9 is a perspective view of an optional end gripping device which allows the flexible outer sleeve as shown in FIG. 8 to move in concert with the SMA element.
Figure 10:
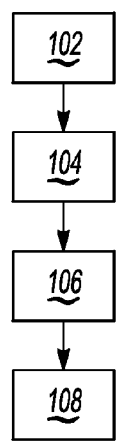
FIG. 10 is a flow chart describing a method for optimizing the cycle time of an SMA actuator.

Referring to FIG. 9, the SMA actuator 716 of FIG. 8, or any of the variants of the SMA actuator 16 shown in FIG. 1, may optionally include an end gripper assembly 40. A portion of a cable 75 of the SMA actuator 716 is shown in FIG. 9. The assembly 40 may be used to physically connect the SMA element 15 to the flexible outer layer 24 and its various embodiments. The SMA element 15 may be clamped, crimped, or otherwise mechanically connected to the assembly 40, for instance by using a retaining portion 50 of the assembly 40. In one embodiment, the retaining portion 50 may be configured as crimping prongs 52 as shown or as another suitable device. A clamp 42 connected to the remainder of the assembly 40 may squeeze the flexible layer 24 toward the SMA element 15.

The use of the end gripper assembly 40 may help reduce any shear stresses present at or along an interface between the SMA element 15 and the flexible outer layer 24. Doing this can increase the useful life of any bond present between the SMA element 15 and the flexible outer layer 24. Use of the assembly 40 causes the flexible outer layer 24 to move in concert with the SMA element 15 during a phase transformation of the SMA element 15. For instance, when the SMA element 15 shortens, the flexible outer layer 24 can move at least partially into an opening 34 defined by an end 30 of the cable 75. While the assembly 40 may increase the effective load which the SMA actuator 716 must overcome, such additional load is not expected to be excessive, particularly as the flexible outer layer 24 must already be stretched during a return/disengagement phase of the actuation cycle.

A method 100 for reducing the cycle time required for completing an actuation cycle of the SMA actuator 16 and its various embodiments is described with respect to the system 10 of FIG. 1. At step 102, the method 100 includes providing the SMA actuator 16 configured as described above. That is, the SMA actuator 16 should include an SMA element 15 surrounded by a flexible outer layer 24 with the predetermined geometric cross-sectional shape and material properties of the layer 24 and its SMA element 15 for collectively optimizing the heat transfer characteristics of the SMA actuator 16.

Step 104 includes connecting the SMA actuator 16 to a load 18. The method 100 then proceeds to step 106, wherein the SMA actuator 16 is activated using the heating source 14 or other suitable activation means to thereby cause a first phase change of the SMA element 15. For instance, the SMA element 15 may undergo a change from the Martensite (m) phase to the Austenite (a) phase as noted above. Once activated, the method 100 proceeds to step 108.

At step 108, the SMA actuator 16 is deactivated once the load 18 of FIG. 1 has been acted on. Step 108 may entail using the cooling source 25 or ambient/free air to cause a second phase change of the SMA element 15. This phase change may be a change from the Austenite (a) phase to the Martensite (m) phase. The flexible outer layer 24 increases the speed of the second phase change as described above. The second phase change at step 106 may optionally entail altering the nominal geometry and the thermal conductivity of the SMA actuator 16 as described in detail above with reference to FIG. 7.

While the best modes for carrying out the invention have been described in detail, those familiar with the art to which this invention relates will recognize various alternative designs and embodiments for practicing the invention within the scope of the appended claims.

The invention claimed is:

1. A shape memory alloy (SMA) actuator configured to couple to and move a load, comprising:
   an SMA element, wherein the SMA element is activated by a heating source during an activation phase of an actuation cycle and deactivated during a deactivation/return phase of the actuation cycle; and
   a flexible outer layer that surrounds and coats the SMA element, such that the flexible outer layer is adhered to or bonded to the SMA element along an interface between the SMA element and the flexible outer layer, wherein the flexible outer layer has a predetermined non-circular geometric cross-sectional shape and a material composition that collectively optimizes the heat transfer characteristics of the SMA actuator, thereby reducing a cycle time required for completing the actuation cycle;

wherein the flexible outer layer is configured to compress or shorten in an axial direction along with the SMA element during the activation phase.

2. The SMA actuator of claim 1, wherein the non-circular geometric cross-sectional shape of the flexible outer layer is one of: a star, an oval, an elongated marquise, and a tear drop.

3. The SMA actuator of claim 1, wherein the flexible outer layer includes one of: high thermal conductivity flexible silicone, electronic paper, and stretchable thin graphene film, and carbon nanotubes.

4. The SMA actuator of claim 1, wherein the flexible outer layer includes carbon nanotubes, and wherein a nominal geometry and the thermal conductivity of the SMA actuator are both altered during the activation phase via a change in alignment of the carbon nanotubes.

5. The SMA actuator of claim 1, further comprising a plurality of discrete elements oriented in a radially-outward direction with respect to the SMA element, and partially embedded in the flexible outer layer, wherein an activation of the SMA actuator causes the discrete elements to move radially outward away from the SMA element and thereby alter a thermal conductivity of the flexible outer layer during the activation phase of the SMA element, and wherein a deactivation of the SMA actuator causes the discrete elements to retract at least partially into the flexible outer layer.

6. The SMA actuator of claim 5, wherein the discrete elements include at least one of: a high-conductivity fiber and a carbon nanotube.

7. The SMA actuator of claim 1, further comprising an end gripper assembly which causes the flexible outer layer to move in concert with the SMA element during a phase transformation of the SMA element, the end gripper assembly including:
    a retaining portion that includes prongs which are crimped to the SMA element axially outside of the flexible layer; and
    a clamp which squeezes the flexible layer radially toward the SMA element.

8. An electro-mechanical system comprising:
    a heating source; and
    a shape memory alloy (SMA) actuator configured for coupling to a load, the SMA actuator having:
        an SMA element having a circular geometric cross-sectional shape, and which is activated by the heating source during an activation phase of an actuation cycle, and deactivated during a deactivation/return phase of the actuation cycle; and
        a flexible outer layer surrounding and coating the SMA element, such that the flexible outer layer is adhered to or bonded to the SMA element along an interface between the SMA element and the flexible outer layer, and having a non-circular geometric cross-sectional shape;
    wherein the flexible outer layer has a thermally conductive material composition that collectively optimize the heat transfer characteristics of the SMA actuator, thereby reducing a cycle time required for completing the actuation cycle; and
        wherein the flexible outer layer is configured to compress or shorten in an axial direction along with the SMA element during the activation phase.

9. The system of claim 8, wherein the non-circular geometric cross-sectional shape is one of: a star, an oval, an elongated marquise, and a tear drop.

10. The system of claim 8, wherein the flexible outer layer is constructed of one of a flexible coating deposited onto the SMA element and a flexible sleeve.

11. The system of claim 8, wherein the flexible outer layer includes one of: high thermal conductivity flexible silicone, electronic paper, stretchable thin graphene film, and carbon nanotubes.

12. The system of claim 8, wherein at least one of a nominal geometry and a thermal conductivity of the SMA element are altered during the activation phase.

13. The system of claim 12, further comprising a plurality of discrete elements oriented in a radially-outward direction with respect to the SMA element, and partially embedded in the flexible outer layer, wherein an activation of the SMA actuator causes the discrete elements to move radially outward from the SMA element, and wherein a deactivation of the SMA actuator causes the discrete elements to retract to some extent back into the flexible outer layer.

14. The system of claim 13, wherein the discrete elements include at least one of a high-conductivity fiber and a carbon nanotube.

15. The system of claim 8, further comprising an end gripper assembly which causes the flexible outer layer to move in concert with the SMA element during a phase transformation of the SMA element, the end gripper assembly including:
    a retaining portion that includes prongs which are crimped to the SMA element axially outside of the flexible layer; and
    a clamp which squeezes the flexible layer radially toward the SMA element.

16. A method for reducing a cycle time required for completing an actuation cycle of a shape memory alloy (SMA) actuator, the method comprising:
    providing the SMA actuator, wherein the SMA actuator includes an SMA element having a circular geometric cross-sectional shape surrounded by and coated on the entirety of its radial outer surface with a flexible outer layer, such that the flexible outer layer is adhered to or bonded to the SMA element along an interface between the SMA element and the flexible outer layer, and wherein the flexible outer layer has a predetermined non-circular geometric cross-sectional shape and material properties that collectively optimize the heat transfer characteristics of the SMA actuator;
    connecting an SMA actuator to a load;
    activating the SMA actuator using a heating source to cause a first phase change of the SMA element, including causing the flexible outer layer to compress or shorten in an axial direction along with the SMA element during the activation phase; and
    deactivating the SMA actuator to cause a second phase change of the SMA element, wherein the flexible outer layer increases the speed of at least one of the first phase change and the second phase change;
    wherein the non-circular geometric cross-sectional shape is one of: a star, an oval, an elongated marquise, and a tear drop.

17. The method of claim 16, further comprising: altering the nominal geometry and the thermal conductivity of the SMA actuator during one of the first and the second phase changes.

18. The method of claim 17, wherein the SMA actuator includes a plurality of discrete elements oriented in a radially-outward direction with respect to the SMA element, and wherein activating the SMA actuator includes automatically moving the discrete elements radially outward from the flexible outer layer to thereby change a thermal conductivity of the flexible outer layer.

19. The method of claim 16, further comprising: retaining the SMA element using an end gripper assembly having prongs and a clamp to thereby cause the flexible outer layer to move in concert with the SMA element during a phase transformation of the SMA element, including crimping the prongs of the end gripper assembly to the SMA element axially outside of the flexible layer and squeezing the flexible layer radially toward the SMA element via the clamp.

* * * * *